(12) United States Patent
Brophy et al.

(10) Patent No.: US 10,489,748 B2
(45) Date of Patent: Nov. 26, 2019

(54) MANAGING THE GENERATION OF TEXT MESSAGES

(71) Applicant: Upwire Pty Ltd., Crows Nest, NSW (AU)

(72) Inventors: Ben Brophy, Crows Nest (AU); Shane Berkinshaw, Crows Nest (AU)

(73) Assignee: Upwire Pty Ltd., Crows Nest, NSW (AU)

( * ) Notice: Subject to any disclaimer, the term of this patent is extended or adjusted under 35 U.S.C. 154(b) by 0 days.

(21) Appl. No.: 15/552,077

(22) PCT Filed: Feb. 18, 2016

(86) PCT No.: PCT/AU2016/050111
§ 371 (c)(1),
(2) Date: Aug. 18, 2017

(87) PCT Pub. No.: WO2016/131106
PCT Pub. Date: Aug. 25, 2016

(65) Prior Publication Data
US 2018/0046984 A1   Feb. 15, 2018

(30) Foreign Application Priority Data

Feb. 18, 2015 (AU) .............................. 2015900556
Nov. 23, 2015 (AU) .............................. 2015904827

(51) Int. Cl.
*G06Q 10/10* (2012.01)
*H04W 4/14* (2009.01)
(Continued)

(52) U.S. Cl.
CPC ......... *G06Q 10/107* (2013.01); *G06F 3/0482* (2013.01); *G06F 3/0486* (2013.01);
(Continued)

(58) Field of Classification Search
None
See application file for complete search history.

(56) References Cited

U.S. PATENT DOCUMENTS 6,999,565 B1 * 2/2006 Delaney ............... G06Q 10/107
379/67.1
8,886,735 B1   11/2014 Liu et al.
(Continued)

FOREIGN PATENT DOCUMENTS

CA       2355965 A1    2/2003

OTHER PUBLICATIONS

International Search Report and Written Opinion of the International Searching Authority corresponding to PCT/AU2016/050111 dated May 5, 2016.
(Continued)

*Primary Examiner* — Younes Naji
(74) *Attorney, Agent, or Firm* — Kilpatrick Townsend & Stockton LLP

(57) ABSTRACT

This disclosure relates to sending electronic messages, including SMS, voice and email messages. A processor generates a graphical user interface with multiple message types as options to a user, and with multiple functional features for each of the multiple message types. The user selects message types and functional features for the message types. The processor stores a template as one of multiple templates associated with a template identifier. The template comprises data indicative of the selected message types and the selected functional features. Received message generation request data comprises addresses associated with a template identifier. The processor selects a second template from the multiple templates such that the second template is associated with the template identifier and creates for each
(Continued)

of the message addresses an electronic message and sends each electronic message to the associated message address.

18 Claims, 17 Drawing Sheets

(51) Int. Cl.
  *G06F 3/0482* (2013.01)
  *G06F 3/0486* (2013.01)
  *G06F 8/38* (2018.01)
  *G06Q 10/06* (2012.01)
  *H04L 12/58* (2006.01)
(52) U.S. Cl.
  CPC ............... *G06F 8/38* (2013.01); *G06Q 10/06* (2013.01); *H04L 51/04* (2013.01); *H04L 51/28* (2013.01); *H04W 4/14* (2013.01)

(56) References Cited

U.S. PATENT DOCUMENTS

| | | | |
|---|---|---|---|
| 2003/0101283 | A1 | 5/2003 | Lewis et al. |
| 2003/0208526 | A1* | 11/2003 | Imanishi ................ G06Q 30/06 709/201 |
| 2005/0020250 | A1* | 1/2005 | Chaddha ................ H04L 51/24 455/414.1 |
| 2005/0278773 | A1* | 12/2005 | DeCinque .............. H04N 7/173 725/138 |
| 2006/0026256 | A1 | 2/2006 | Diddee et al. |
| 2006/0058048 | A1* | 3/2006 | Kapoor .................. G06Q 30/02 455/466 |
| 2006/0101034 | A1* | 5/2006 | Murphy ................. G06Q 10/10 |
| 2008/0147812 | A1 | 6/2008 | Curtis |
| 2009/0109478 | A1* | 4/2009 | Maeda ............... H04N 1/00954 358/1.15 |
| 2013/0041958 | A1* | 2/2013 | Post ..................... G06Q 10/107 709/206 |
| 2015/0110260 | A1* | 4/2015 | Marum ............... H04M 3/4285 379/207.02 |
| 2015/0177702 | A1* | 6/2015 | Kehoe .................. G04G 9/0076 368/21 |
| 2015/0278171 | A1* | 10/2015 | Lefebvre ............. G06F 17/2247 715/760 |

OTHER PUBLICATIONS

Supplementary European Search Report for EP 16751829 dated Dec. 21, 2018, all pages.

* cited by examiner

| Item | Owner | Feature | SMS-OUT | SMS-IN | Voice-Out | Voice-IN | Email-Out | Email-IN |
|---|---|---|---|---|---|---|---|---|
| 1 | | Global pre-fix lookup | Yes | Yes | Yes | Yes | No | No |
| 2 | | Number cleansing/List cleansing | Yes | No | Yes | No | No | No |
| 3 | | SMSize Body | Yes | No | No | No | No | No |
| 4 | | Deliver in recipient's time zone | Yes | No | Yes | No | No | No |
| 5 | | Scheduled Start Time | Yes | No | Yes | No | Yes | No |
| 6 | | Scheduling/delivery windows | Yes | No | Yes | Yes | Yes | Yes |
| 7 | | Pacing | Yes | No | Yes | No | Yes | No |
| 8 | | Shortlink URL | Yes | No | No | No | Yes | No |
| 9 | | Throttle - inbound Http requests | Yes | No | Yes | No | Yes | No |
| 10 | | Throttle - Outbound Queues By userAccount | Yes | No | Yes | No | | |
| 11 | | opt-Out Key Word Library | Yes | Yes | | | | |
| 12 | | Opt-Out Custom Link/Check | No | No | No | No | Yes | No |
| 13 | | Keyword Library | No | Yes | No | Yes | No | Yes |
| 14 | | Job Charge Estimator | Yes | Yes | Yes | Yes | Yes | Yes |
| 15 | | Custom API Integrator | Yes | Yes | Yes | Yes | Yes | Yes |
| 17 | | Unique pin code | Yes | Yes | Yes | Yes | Yes | Yes |
| 18 | | Text-2-Speech | No | No | Yes | Yes | No | No |
| 19 | | Voice-2-Text | No | No | Yes | Yes | No | No |
| 20 | | IVR | No | No | Yes | Yes | No | No |
| 21 | | Number masking | Yes | Yes | Yes | Yes | No | No |
| 22 | | Litmus testing | Yes | No | No | No | Yes | No |

Jobs list                                                    904
902 —job1: Account_ID="BestBank", Template_ID="NewT&C", job_ID="3LZf" {
  902 — job_item1:       912
         item_ID="x4jm"
         SMS-OUT, number="+49436599046,
         BODY="Please accept new T&C by replying 'Yes'"
         SEND_AT=UTC 9:00
  902 — job_item2:       914
         item_ID="4P5E"
         SMS-OUT, number="+61491129821,
         BODY="Please accept new T&C by replying 'Yes'"
         SEND_AT=UTC 0:00
  902 — job_item3:       916
         item_ID="ihK5"
         SMS-OUT, number="+1442617931,
         BODY="Please accept new T&C by replying 'Yes'"
         SEND_AT=UTC 18:00
}

Fig. 9

MANAGING THE GENERATION OF TEXT MESSAGES

CROSS-REFERENCE TO RELATED APPLICATIONS

The present application claims priority from Australian Provisional Patent Application No 2015900556 filed on 18 Feb. 2015, the content of which is incorporated herein by reference. The present application also claims priority from Australian Provisional Patent Application No 2015904827 filed on 23 Nov. 2015, the content of which is incorporated herein by reference.

TECHNICAL FIELD

This disclosure relates to sending electronic messages, such as, but not limited to, SMS, voice and email messages.

BACKGROUND

Automatically generated electronic messages provide an important means of communication between businesses and their customers. For example, banks can send SMS text messages to their clients which contain a single use identification token. SMS gateways provide services that allow businesses to send SMS message to a large number of customers. However, it is often complicated to configure these gateways for complex interactions with the customers and detailed experience with scripting languages is often required.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

A method for sending electronic messages, the method comprising:
  generating a graphical user interface, the graphical user interface comprising:
    a first user input element to present multiple message types as options to a user, and
    a second user input element to present multiple functional features for each of the multiple message types to the user;
  receiving user input in relation to the user interface indicative of one or more selected message types and one or more selected functional features for each of the one or more selected message types;
  storing a first template as one of multiple templates on a data store associated with a template identifier, the first template comprising data indicative of the one or more selected message types and the one or more selected functional features;
  receiving message generation request data, the message generation request data comprising one or more message addresses associated with a template identifier;
  selecting a second template from the multiple templates such that the second template is associated with the template identifier;
  creating for each of the one or more message addresses an electronic message associated with that message address; and
  sending each electronic message to the associated message address.

Since a user can configure a template through the user interface and then upload a list of message addresses, the messaging process can be configured conveniently and with little technical experience. Particularly, programming skills in scripting languages are not required and marketing staff, for example, can set up a messaging process themselves. The template identifier included in the message generation request data allows the selection of a previously stored template and therefore, the decoupling of template configuration from the generation of messages based on a list of addresses.

The method may further comprise receiving scheduling data, wherein sending each message comprises determining a schedule for sending each message based on the scheduling data.

Further, receiving scheduling data may comprise one or more of
  receiving scheduling data from the user through the graphical user interface; and
  receiving scheduling data as part of the message generation request data.

Further, scheduling data may comprise data indicative of a time window for sending the messages. Scheduling data may comprise data indicative of a starting time for sending the messages.

Further, the method may further comprise determining an association between a message address and a time zone wherein determining a schedule for sending each message is based on the time zone. Determining the association between a message address and a time zone may comprise determining a prefix of a telephone number.

Receiving message generation request data may comprise receiving an incoming phone call at an incoming telephone number and the incoming telephone number is the template identifier.

Sending each message may comprise creating a job item for each message and storing the job item in a job queue.

The message generation request data may be one or more of XML and JSON data. The method may further comprise determining a template identifier based on the one or more of XML and JSON data.

Sending the messages may comprise determining a destination country and a route comprising a telecommunications provider of the destination country.

One or more of the first user element and the second user element may comprise drag and drop items.

The graphical user interface may further comprise a third user input element to present one or more options for relating the message types to the functional features to the user and the method further comprises receiving user input in relation to the third user input element indicative of one or more selected relations that relate the message types to the functional features. The selected relation may be a conditional element and the method may further comprise receiving user input indicative of a condition to configure the selected relation. The method may further comprise receiving user input in relation to the selected message type to relate a status connector representing a status of sending the selected message type to a conditional relation.

Generating the graphical user interface may comprise generating a graphical user interface comprising a first page and a second page, wherein the first user input element is located on the first page and the second user input element is located on the second page.

The method may further comprise:
generating a document editor user interface comprising multiple document features;
receiving user input in relation to the document editor user interface indicative of one or more selected document features; and
storing multiple documents, wherein each of the multiple documents represents the user input and is in a different document format.

The method may further comprise applying a filter to the one or more message addresses. The filter may be based on user input data.

Software, that when installed on a computer causes the computer to perform the method described above.

A system for sending messages, the system comprising:
a processor to generate a graphical user interface, the graphical user interface comprising:
  a first user input element to present multiple message types as options to a user, and
  a second user input element to present multiple functional features for each of the multiple message types to the user;
a first input port to receive user input in relation to the user interface indicative of one or more selected message types and one or more selected functional features for each of the one or more selected message types;
a data store to store a first template as one of multiple templates associated with a template identifier, the first template comprising data indicative of the one or more selected message types and the one or more selected functional features;
a second input port to receive message generation request data, the message generation request data comprising one or more message addresses associated with a template identifier;
the processor
  to select a second template from the multiple templates such that the second template is associated with the template identifier, and
  to create for each of the one or more message addresses a message associated with that message address; and
an output port to send each message to the associated message address.

Optional features described of any aspect of method, computer readable medium or computer system, where appropriate, similarly apply to the other aspects also described here.

BRIEF DESCRIPTION OF DRAWINGS

An example will be described with reference to
FIG. 1 illustrates a computer system for sending messages.
FIG. 5 is a table showing which functional features are available for which message type.
FIG. 9 illustrates a jobs list comprising a job item for each message.

DESCRIPTION OF EMBODIMENTS

Figure 1:
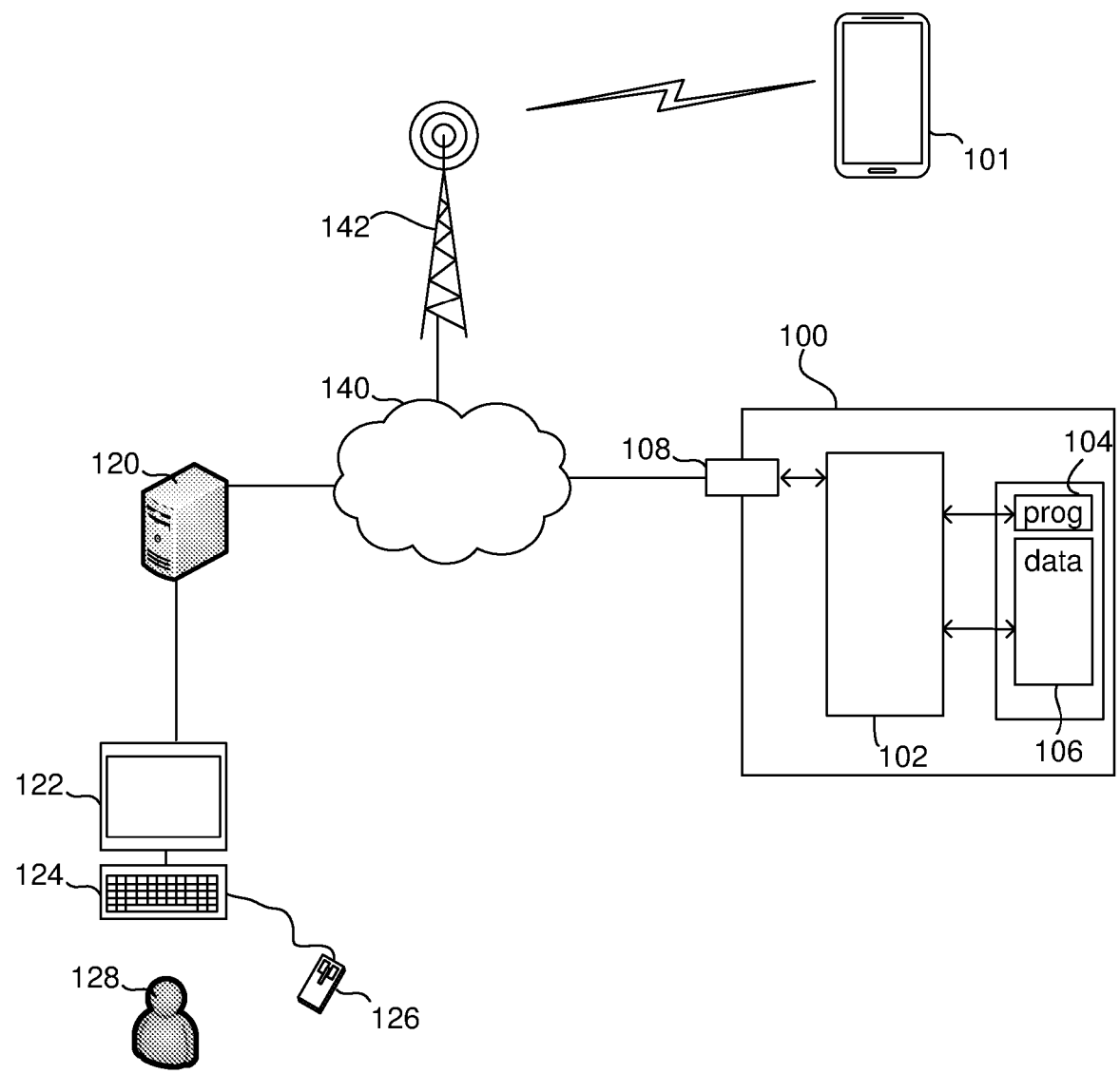

FIG. 1 illustrates a computer system 100 for sending messages to a recipient's device 101 and a client computer 120 connected to the computer system 100 via computer network 140, such as the Internet. The computer system 100 comprises a processor 102 connected to a program memory 104, a data memory 106 and a communication port 108. Although the data memory 106 is shown as an internal component of computer system 100, it may equally be external, such as cloud storage using big tables, such as distributed hash tables (DHT). The communication port 108 may be a LAN interface that is connected to network 140 via an internet service provider. In one example, processor 102 receives all data from client computer 120 via communication port 120, which may include HTTP protocol methods, such as GET, POST or XMLHttpRequest and file stream upload data.

In another example, computer system 100 comprises a further data port (not shown) for receiving XML data over HTTP protocol methods or in files, such as comma separated values (CSV), via FTP. Further, the CSV data may be embedded in an XML structure. For example, a different FTP server may allow the upload of files onto data store 106. Processor 102 then receives the uploaded FTP file via a memory port of processor 102 connected to a system bus instead of a LAN port. The program memory 104 is a non-transitory computer readable medium, such as a hard drive, a solid state disk or CD-ROM. It is to be understood that any reference to XML is equally applicable to JSON. Further, in this disclosure alternative file transfer methods can be used such as HTTP(S).

Client computer 120 is connected to a display device 122, a first input device 124, such as a keyboard, and a second input device 126, such as a computer mouse. Similar to the computer system 100, client computer 120 also comprises a processor, program and data memory and a communication port to communicate with computer system 100 via Internet 140.

Figure 2:
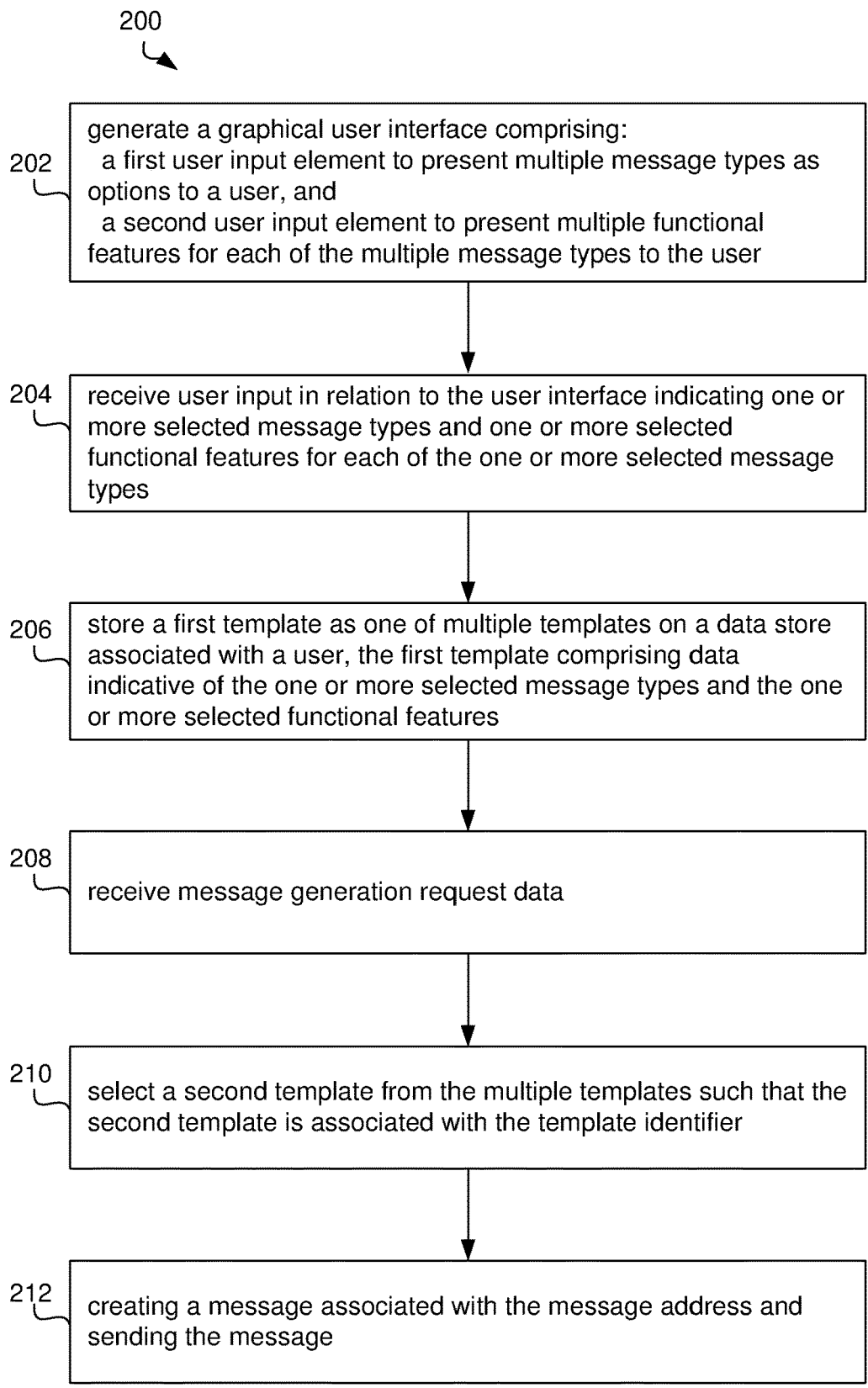
FIG. 2 illustrates a method for sending messages.

Software, that is, an executable program stored on program memory 104 causes the processor 102 to perform the method in FIG. 2, that is, processor 102 generates a graphical user interface such that it can be accessed by client computer 120 and displayed on display device 122. Processor 102 further receives via communication port 108 user input provided by a user 128 interacting with the graphical user interface using keyboard 124 and mouse 126. Accordingly, processor 102, generates a template for sending messages. Processor 102 then receives via communication port 108 or via a separate different port (not shown), such as a file upload interface, communication addresses to initiate the template and to send the messages according to the template. In one example, processor 102 sends the messages through communication port 108, such as by sending message requests to a cellular network operator 142 via the internet 140. In another example, computer system 100 comprises a separate output port to send the message, such as a direct link to the cellular network operator 142.

The processor 102 stores the template on data store 106, such as on RAM, processor registers, hard disk, flash disk or cloud storage. Processor 102 may also send the determined template via communication port 108 to a server, such as a backup server.

The processor 102 may receive data, such as template data, from data memory 106 as well as from the communications port 108. In one example, the processor 102 receives template data from the user via communications port 108, such as by using a Wi-Fi network according to IEEE 802.11. The Wi-Fi network may be a decentralised ad-hoc network, such that no dedicated management infrastructure, such as a router, is required or a centralised network with a router or access point managing the network.

It is to be understood that any kind of data port may be used to receive data, such as a network connection, a memory interface, a pin of the chip package of processor 102, or logical ports, such as IP sockets or parameters of functions stored on program memory 104 and executed by processor 102. These parameters may be stored on data memory 106 and may be handled by-value or by-reference, that is, as a pointer, in the source code.

The processor 102 may receive data through all these interfaces, which includes memory access of volatile memory, such as cache or RAM, or non-volatile memory, such as an optical disk drive, hard disk drive, storage server or cloud storage. The computer system 100 may further be implemented within a cloud computing environment, such as a managed group of interconnected servers hosting a dynamic number of virtual machines.

It is to be understood that any receiving step may be preceded by the processor 102 determining or computing the data that is later received. For example, the processor 102 determines a list of addresses by filtering the input list and stores the filtered list in data memory 106, such as RAM or a processor register. The processor 102 then requests the data from the data memory 106, such as by providing a read signal together with a memory address. The data memory 106 provides the data as a voltage signal on a physical bit line and the processor 102 receives the filtered list via a memory interface.

FIG. 2 illustrates a method 200 as performed by processor 102 for sending messages. FIG. 2 is to be understood as a blueprint for a messaging software program and may be implemented step-by-step, such that each step in FIG. 2 is represented by a function in a programming language, such as C++ or Java. The resulting source code is then compiled and stored as computer executable instructions on program memory 104.

Preceding the execution of method 200 may be a login process, where the processor 102 receives from the user a user name and password. If no account exists for that user, it can be created at this stage. The account may be a master account comprising multiple sub-accounts and different users from the same subscriber may have access to different sub-accounts. This login procedure is useful as the input data from the user which is stored by processor 102 on data memory 106 can be associated with the user by storing the input data together with an account identifier as will be described below. It is to be understood that in the following the term account identifier may refer to the identifier of a master account or a sub-account.

Figure 3:
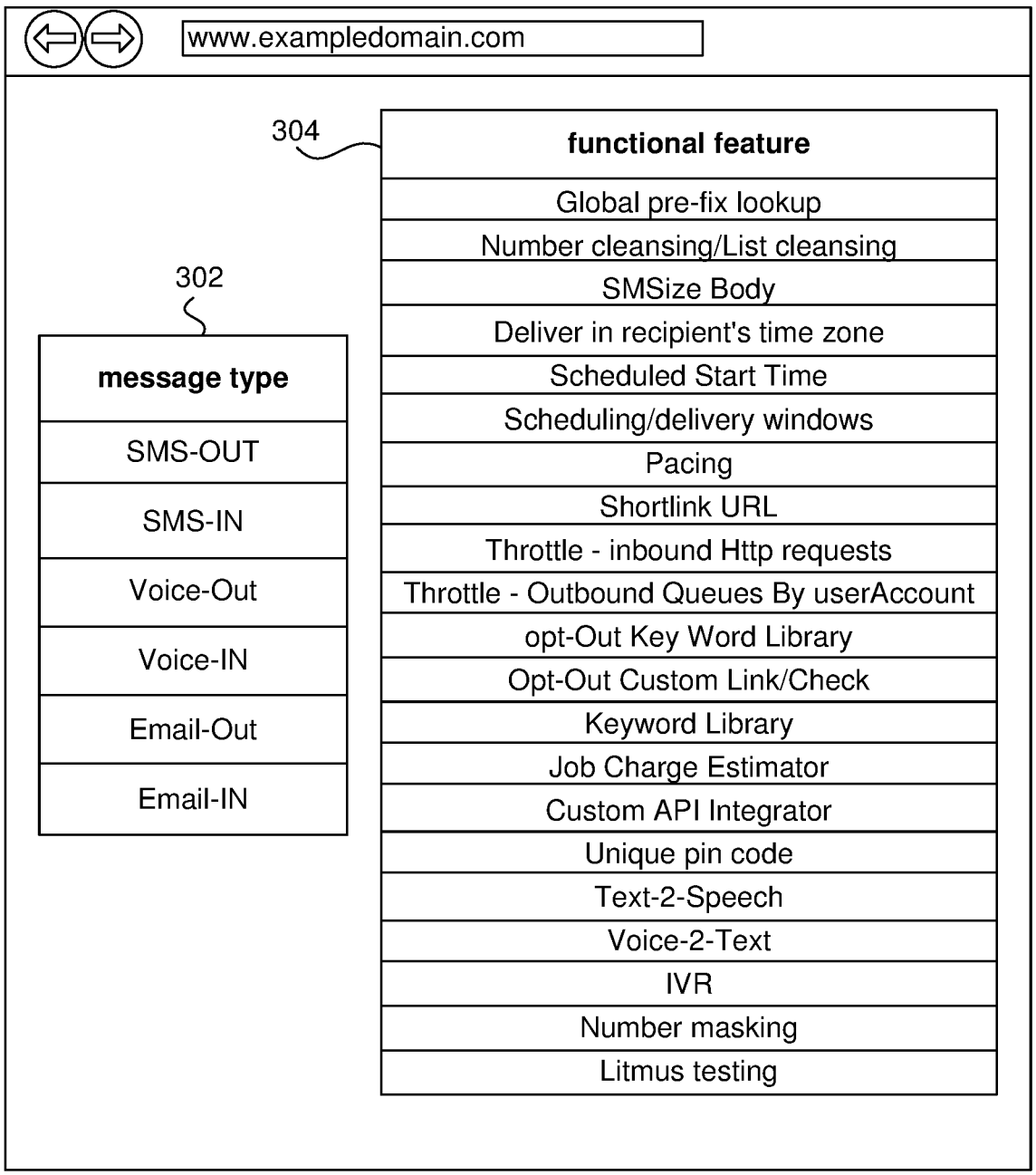
FIG. 3 illustrates an example graphical user interface.

FIG. 3 illustrates a graphical user interface 300 as generated by processor 102 in step 202 of method 200. In one example, generating the graphical user interface 300 means dynamically generating HTML code of the interface 300 and storing the generated code on data memory 106, such that a client computer can access the interface 300 by using a browser software, such as Internet Explorer, Mozilla Firefox or Chrome. FIG. 3 shows the interface 300 as it is rendered on the screen 122 of client computer 120.

The graphical user interface 300 comprises a first user input element 302 to present multiple message types as options to a user. The interface 300 further comprises a second user input element 304 to present multiple functional features for each of the multiple message types to the user. In the example of FIG. 3, both input elements are lists and the user can select one list item by clicking on that item using computer mouse 126, for example. In other examples, the lists are collapsed, such as in drop down user elements.

Processor 102 receives 204 user input in relation to the user interface indicating one or more selected message types and one or more selected functional features for each of the one or more selected message types. For example, the user interface 300 comprises event handlers of items that are triggered by an interrupt of the computer mouse 126 or touch screen when the pointer is located above that item. The event handlers are functions that execute function code depending on which item is selected such that the processor 102 receives an indication of the selected message type and functional feature.

The term functional feature encompasses functions and operations that processor 102 may perform in relation to the message types. For example, processor 102 may execute the functional features to process data or meta-data of the messages, such as body text or the mobile phone number of SMS messages. The functional features may also be interfaces to other system functions, such as to throttle traffic.

Figure 4:
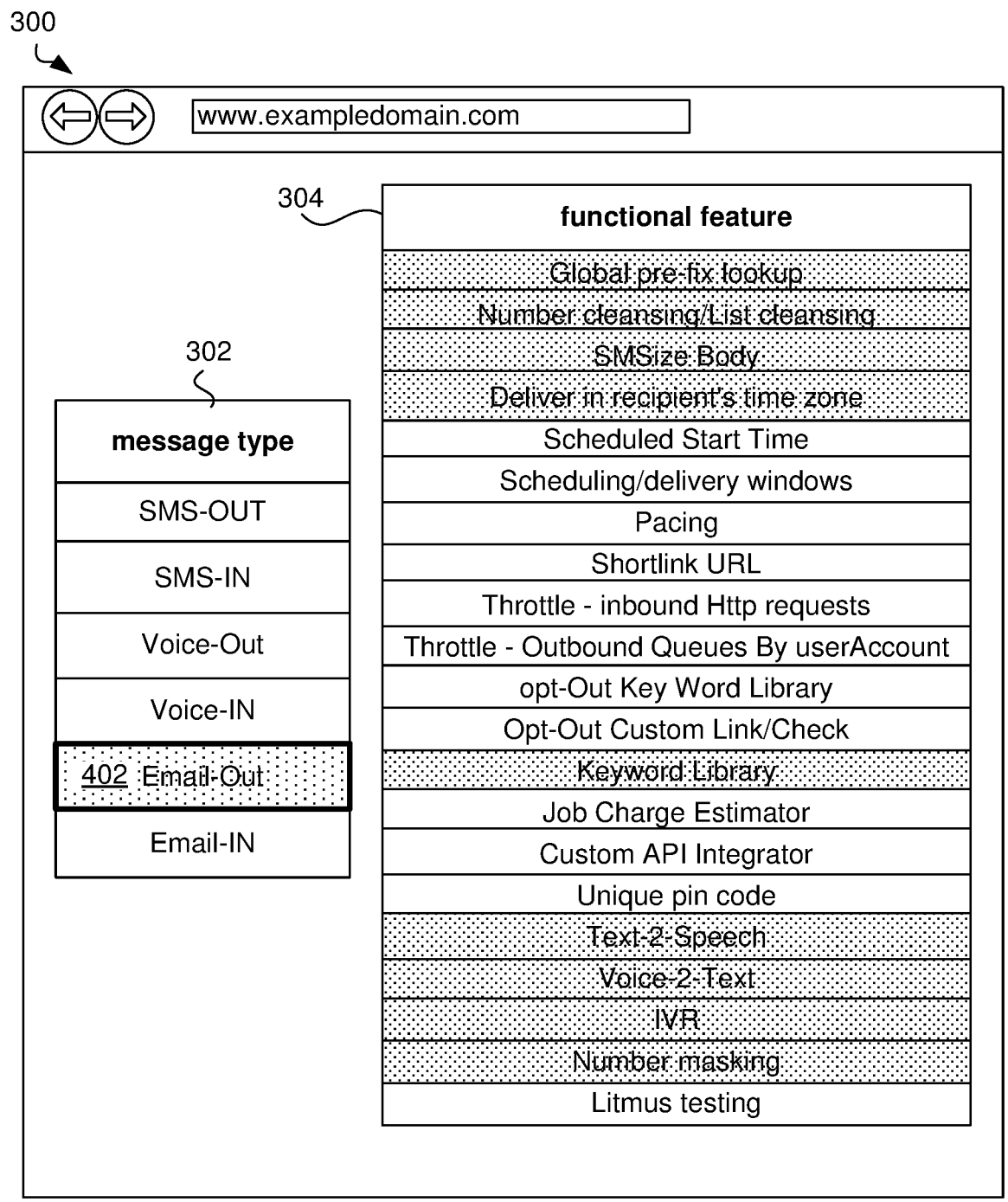
FIG. 4 shows the graphical user interface of FIG. 3 after the user has selected one message type.

In one example, not all functional features are available for every message type. FIG. 4 shows an example, where the user has selected the "Email-Out" 402 message type. The functional features in the functional feature list 304 which are not available are now shaded. In another example, the functional feature list 304 does only display the available features and omits the features that are not available.

FIG. 5 is a table showing which functional features are available for which message type.

Figure 6:
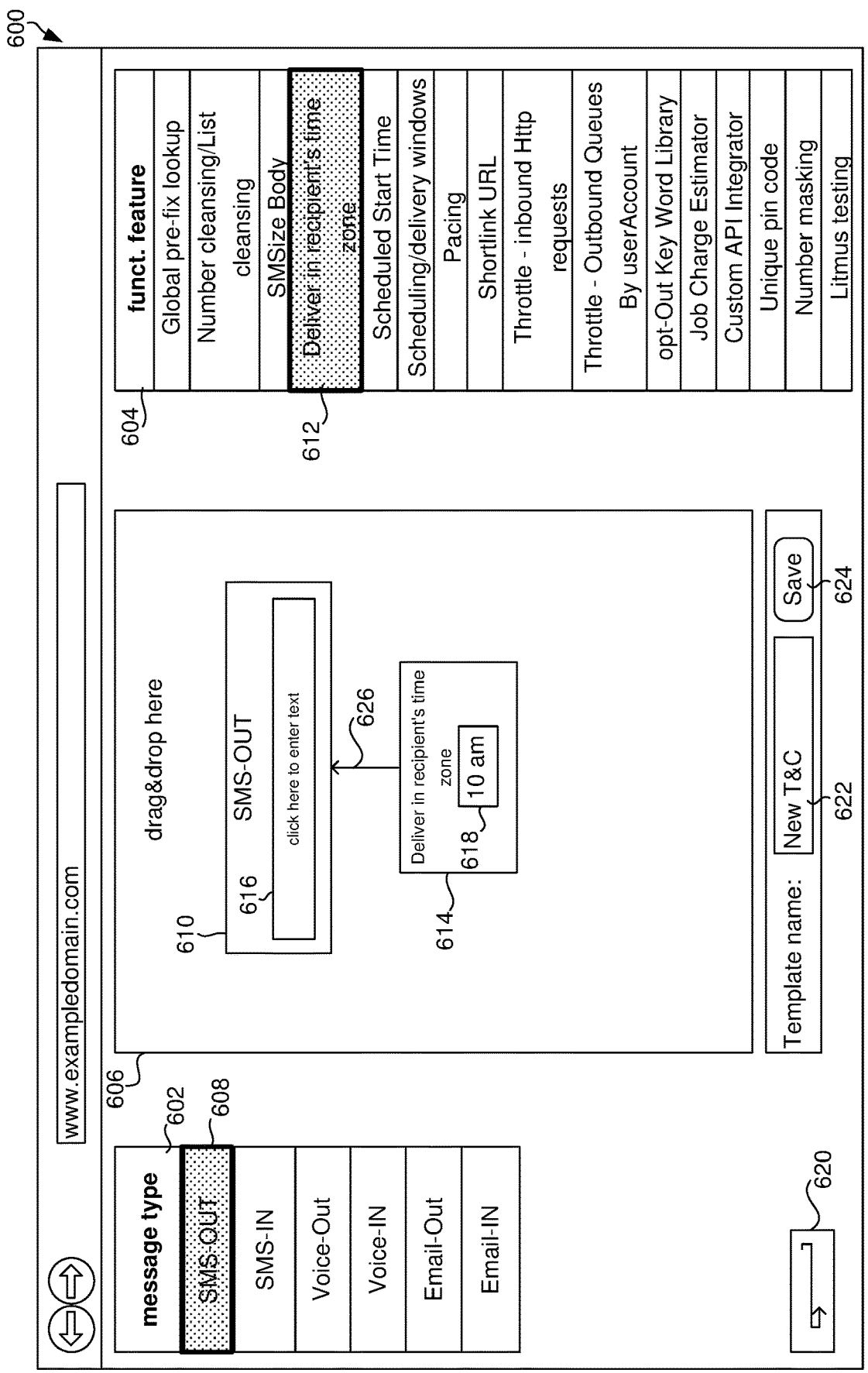
FIG. 6 illustrates another user interface allowing drag and drop.

FIG. 6 illustrates another user interface 600 that allows the user to drag and drop message types and functional features and connect them graphically. User interface 600 comprises a list of message types 602 and a list of functional features 604. These two lists 602 and 604 correspond to the lists 302 and 304 in FIG. 3, respectively. User interface 600 further comprises a design area 606 into which the user 128 can drag and drop the items and which graphically illustrates the current configuration.

In this example, the user has selected the "SMS-OUT" message type 608 from the list of message types 602, dragged it across into the design area 606 and dropped it where it is show as an "SMS-OUT" instance 610. In this example, the list of functional features 604 only shows the features that are available for the "SMS-OUT" message type 608 and the user has selected the "Deliver in recipient's time zone" feature 612, dragged it across into the design area 606 and dropped it where it is shown as a "Deliver in recipient's time zone" instance 614.

The "SMS-OUT" instance 610 comprises a text input field 616 to allow the user to enter a body text for the SMS message. The "Deliver in recipient's time zone" instance 614 comprises a time input field 618 to allow the user to enter a delivery time in the recipients local time zone. In the example of FIG. 6, the user has not entered any body text yet but has entered a delivery time of 10 am.

User interface 600 further comprises a selection element 620 to activate a connector tool. In this example, the user has activated the connector tool and has connected the "Deliver in recipient's time zone" instance 614 to the "SMS-OUT" instance 610, which is indicated by arrow 626. This way, the user can add multiple message type instances of different or the same message type and multiple functional feature instances of different or the same functional feature. The user can then connect these instances to indicate the associations between the message types and functional features.

User interface 600 also comprises an template name text input 622 to allow the user to assign a name to the template designed in design area 606. In this example, the user is an employee of a bank called "BestBank" and the bank has released a new version of their Terms and Conditions (T&C). The bank would now like to send an SMS to each customer to let them approve the new Terms and Conditions by simply replying 'yes' or 'ok' or any other confirmatory phrase. The user names the template "New T&C" and clicks on a save button 624.

When the user drops a message type instance or a functional feature instance into design area 606, the processor 102 receives an indication of the selection of that message type or functional feature.

When the user activates the save button 624 or each time the user drops a message type or feature instance, processor 102 stores 206 a template on data store 106 associated with a template identifier. In this example, the template identifier is the user identifier "BestBank" concatenated with the template name "New T&C" and is unique across all users and all templates managed by processor 102.

Figure 7:
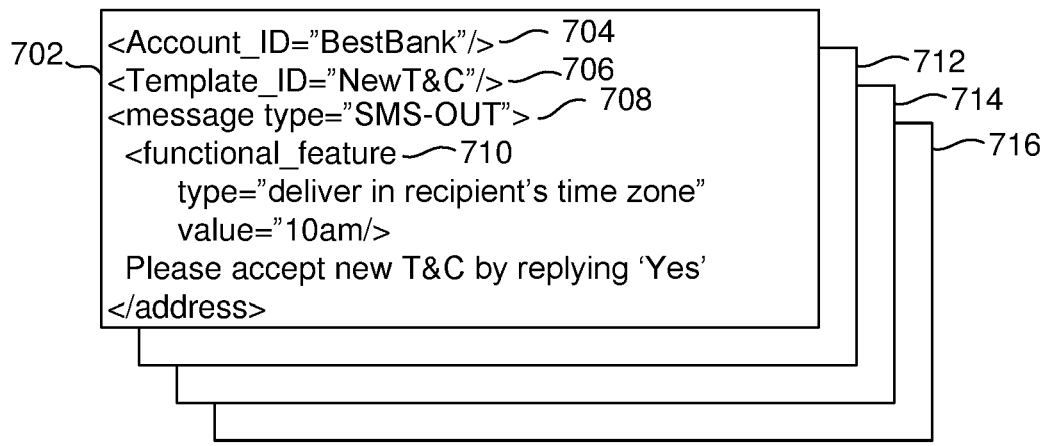
FIG. 7 illustrates a template as stored on a data store.

FIG. 7 illustrates template 702 as stored on data store 106. Template 702 comprises an account identifier 704, a template name 706, data indicative of the one or more selected message types 708 and the one or more selected functional features 710. In one example, processor 102 stores the template 702 on data store 106 as an XML file. Similarly, processor 102 stores multiple further templates 712, 714 and 716 on data store 106. The multiple templates 702, 712, 714 and 716 may be associated with the same account, with sub-accounts of the same account or with different accounts. Processor 102 may store the templates as records in an SQL database, for example. In other examples, processor 102 stores the templates in other systems, such as cloud storage or big tables, such as distributed hash tables (DHT).

Template 702 defines the way in which a received list of numbers is processed to send messages. Therefore, template 702 may also be referred to as an application programming interface (API).

In some examples, processor 102 checks whether the template name has been used before with the same account identifier as this would result in a non-unique template identifier. In other examples, processor 102 generates a unique random string for each template.

By clicking the save button 624 the user completes the template design stage and the templates can now be used for template initiation by providing a list of communication addresses.

Processor 102 receives 208 message generation request data to initiate a particular template. The message generation request data comprises one or more message addresses. In one example, the message generation request data comprises a list of destination addresses.

Figure 8:
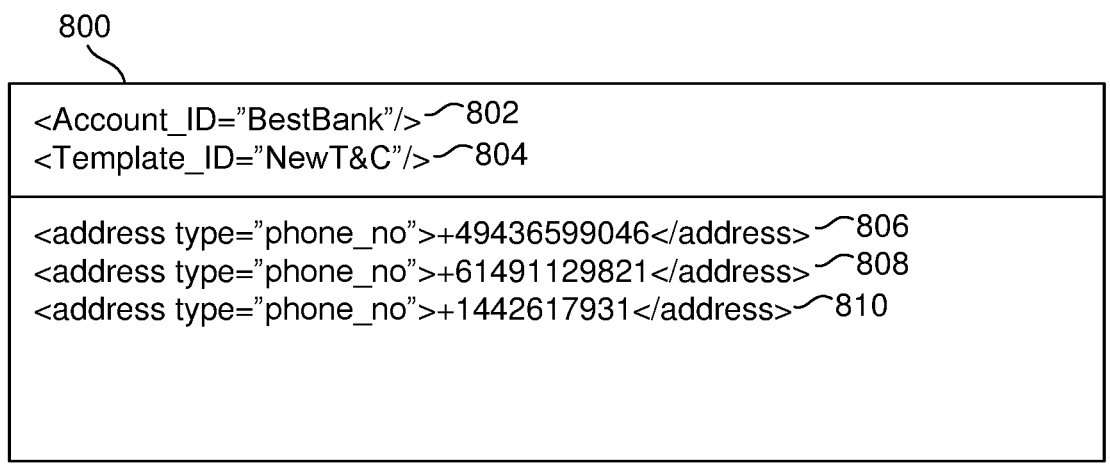
FIG. 8 shows an XML file containing message generation request data.

FIG. 8 shows an example of message generation request data in the form of an XML file 800 that the user uploads to system 100 and consequentially, processor 102 receives the XML file 800. The XML file 800 is associated with a template identifier by including an account identifier 802 and a template name 804 as described above. Processor 102 uses the account identifier 802 and the template identifier 804 together as a template identifier. As mentioned above, the XML file may also be a JSON file or comma separated values (CSV) or tab separated values (TSV). The CSV and TSV may be embedded in an XML structure.

A user may upload the XML file 800 onto a website provided by system 100, copy and paste the XML text into a text box of the website, send the XML file as an attachment of an email, send the XML data in the body text of an email to system 100 or upload the XML file using an FTP software client.

XML file 800 further comprises three records for telephone numbers 806, 808 and 810, respectfully, which are the message addresses in this example. It is noted that each of the telephone numbers 806, 808 and 810 has a country prefix for Germany, Australia and the US, respectively.

Based on the XML file 800, processor 102 selects 210 one of the multiple templates 702, 712, 714 and 716 such that the selected template is associated with the template identifier that is part of the uploaded XML data, that is account identifier 704 and template name 706.

Processor 102 iterates over the records 806, 808 and 810 and creates 212 for each record a message associated with the message address. Processor 102 then sends the message. Sending the message may comprise sending the message over a cellular network, such as a mobile phone network or data network, such as the internet. However, sending the message may also comprise providing sending instructions to a service provider, such as an SMS gateway or email gateway, to send the messages. Processor 102 may send the message as one of multiple massages provided at once to the service provider, also referred to as bulk messaging. In one example, processor 102 creates a jobs list.

FIG. 9 illustrates the jobs list 900 with one single job 902 for the previous example. Job 902 has a job identifier 904 and three job items 906, 908 and 910 corresponding to the three addresses 806, 808 and 810 in FIG. 8, respectively. Each job item 906, 908 and 910 has a job item identifier 912, 914 and 916, respectively.

In this example, the user has added the "Deliver in recipient's time zone" instance 614 in FIG. 6 with a time value of 10 am. Accordingly, when processor 102 generates the job list, processor 102 determines from the country prefix the time zone of each telephone number and determines a schedule comprising a delivery time for each job, such that the messages are delivered at the given local time. In this example, local 10 am is UTC 9:00 in Germany, UTC 0:00 in Sydney and UTC 18:00 in California.

Processor 102 may use more than the country prefix to determine the delivery time in cases where a country spans multiple time zones. For example, processor 102 may perform a reverse lookup to determine the exact location associated with that telephone number to ensure that the message is delivered at the correct time. Processor 102 then sends the message according to the scheduled times by sending the corresponding data to a communication network, such as a cellular network, or a service provider, such as a bulk email service provider. Processor 102 may place the job items into a queue to send or route to different countries and different network operators, that is, telcos.

In one example, processor 102 may receive data from the user 128 indicative of a time window when the messages are to be sent, such as a time windows from 9 am to 5 pm. This is particularly useful for the "VOICE-OUT" message type as most recipients would not appreciate voice calls in the middle of the night.

In one example, the XML file 800 further comprises a data field for a job starting time. This way, the user can send the address list well before the intended start time such that the upload and initiation is completed well before the intended start time. The processor 102 generates the job items and each job item has a "SEND_AT" value that is after the given starting time. The advantage is that less steps need to be performed at the time when the sending should occur which results in increased overall reliability.

In one example, the template 800 is associated with a telephone number that a potential new customer can ring. The user may specify this inbound telephone number via an additional number input element in interface 600. For example, the phone number can be displayed in an advertisement on a billboard. The owner of the advertisement can create a template using interface 600 to define the actions for processor 102 to perform when a customer calls that number. Processor 102 regards this incoming phone call as message generation request. In that case, the message generation request data is the data provided by the cellular network and includes the telephone number of the customer. Processor 102 then generates one job item for that one telephone number of the customer.

In another example, a customer computer system initiates the template. This may be a severe weather or bushfire warning that is triggered automatically by radar or other sensors and is to be sent as an SMS to a preconfigured list of telephone numbers. For example, a warning service provider allows the general public to register their telephone numbers, such as through an online form. When the alarm is triggered the warning service provider sends that list to system 100 to initiate the sending of warning messages. Using this system, the administrator of the warning service can easily configure the sending template, and can configure one template for sending SMS messages and another template for outgoing voice calls to elderly people with only landline phones, for example.

Figure 10:
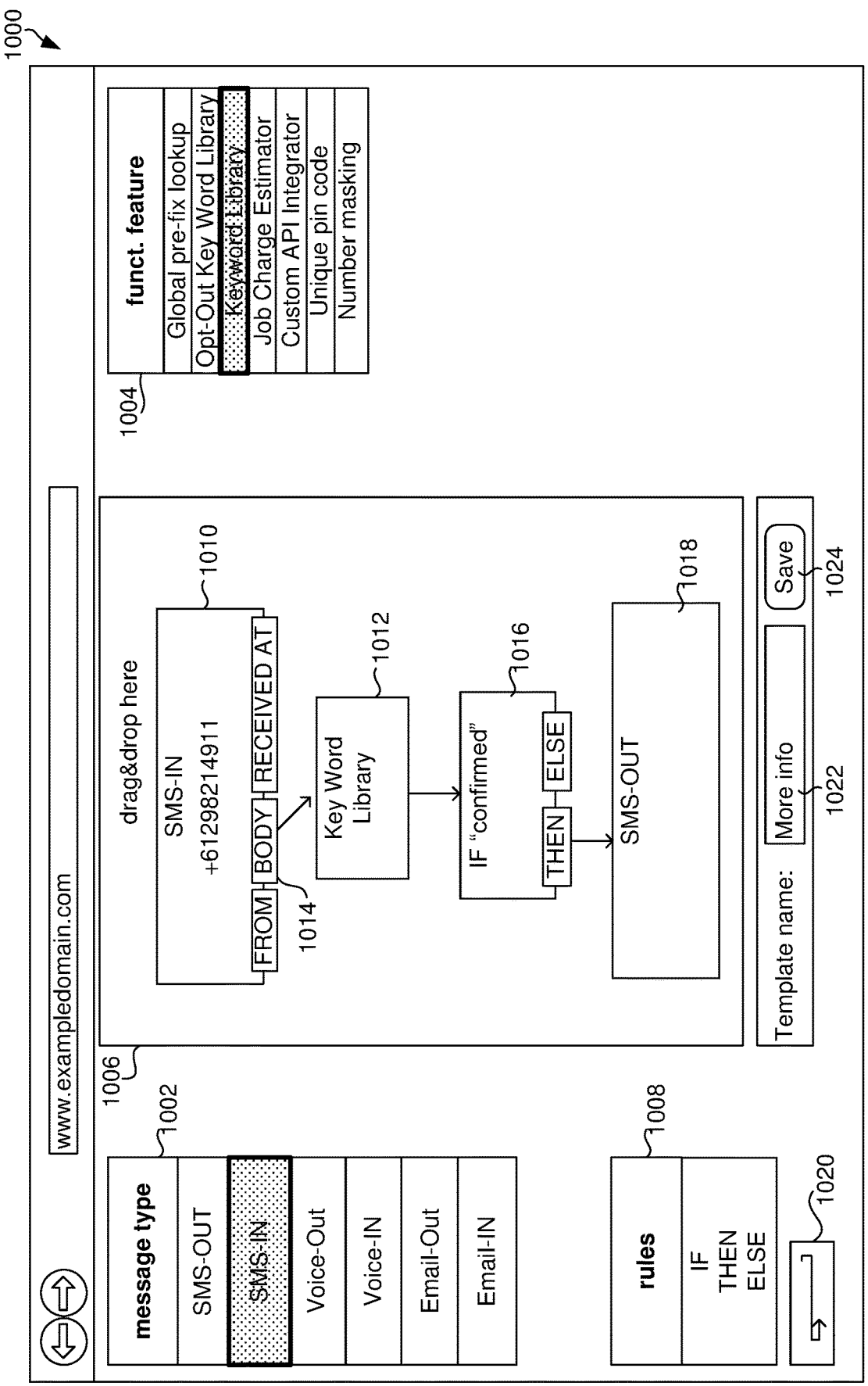
FIG. 10 illustrates another example of a drag and drop graphical user interface.

FIG. 10 illustrates another example of a graphical user interface 1000. Similar to user interface 600 of FIG. 6, user interface 1000 comprises a message type list 1002, a functional features list 1004, a design area 1006, and a connector tool 1020. Additionally, interface 1000 comprises a further user input element 1008 to present multiple options for relating the message types to the functional features to the user, which are also referred to as rules. In this example, the user has created an "SMS-IN" instance 1010 from the message types list 1002 and a "Key Word Library" instance 1012 from the functional features list 1004. The user has then connected instance 1010 to instance 1012 using the connector tool 1020.

In this example, the application is a marketing campaign where customers can send an SMS to a published number to receive more information on a product or a discount coupon. When the user, which could be a marketing manager in this example, creates the "SMS-IN" instance 1010 processor 102 may automatically reserve or select an available incoming telephone number and display that number in instance 1010 so that the user can include that number into the advertisement material.

The user can further double-click on the "Key Word Library" instance 1012 in order to define several keywords that customers might use to request the additional information. The "SMS-IN" instance 1010 may comprise connectors, such as a connector 1014 for body text. When the user graphically connects the body text connector 1014 to the "Key Word Library" instance 1012, processor 102 processes, upon receipt of an SMS at the given number, the body text of the SMS to determine whether one or more of the given keywords are contained in the body text.

The output of the "Key Word Library" instance 1012 may be "confirmed" or refused". The user can then create from the rules list 1008 an "If Then Else" instance 1016, that is, a conditional relation, and connect the "THEN" output to an "SMS-OUT" instance 1018. This way, the user can define one or more relations to relate the message types to the functional features. Again, defining the rules may be a combination of drop-down menus, lists, and drag and drop operations.

The user configures the "SMS-OUT" instance such that the outgoing SMS message contain the requested information or vouchers. The requested information may be in the form of an URL or short URL, such as tinyURL.

Each time the user interacts with the user interface 1000, processor 102 receives an indication of that interaction through the corresponding event handlers triggered by input device interrupts, for example. The processor 102 may further receive a template name 1022 and a "save" command initiated by the user clicking a save button 1024. In response, processor 102 stores the template designed in template design area 1006 on data store 106 as explained with reference to FIG. 7.

The list of functional features may comprise an item for number cleansing or list cleansing, which may be a front-end plugin to define which part of the message generation request data the processor 102 excludes or includes. For example, the cleansing module can be configured by entering "if column="address" THEN include" in order to include an address column. The user can formulate similar filters to exclude specific domains from lists of email addresses, for example. Processor 102 stores these filters as part of the template on data store 106.

Further to the description of job items in relation to FIG. 9, processor 102 creates job items in response to various triggers. These triggers may include an incoming phone call, a reply from a recipient, reception of a bounce or failure notification from a mail server or other decision rules. Processor 102 assigns to each of these events a unique job item identifier. The job item identifier can be included as metadata in other messages or can be stored together with other data records to create an association to the particular event.

Generating or creating a job item may comprise storing a record on an SQL database. This record may comprise a status field that indicates the status of the job item, such as "pending" or "complete". In one example, completed jobs are not deleted by remain on the database for documentation purposes. Further, a billing module may generate an invoice to the user based on the number of job items on the job item database.

Processor 102 may generate a graphical user interface to allow interaction with the job item database. Such an interface may comprise elements that allow setting up filters so that the user can find particular job items of interest. For example, the user may wish to see the number of bounced emails from ".cn" domains.

Figure 11:
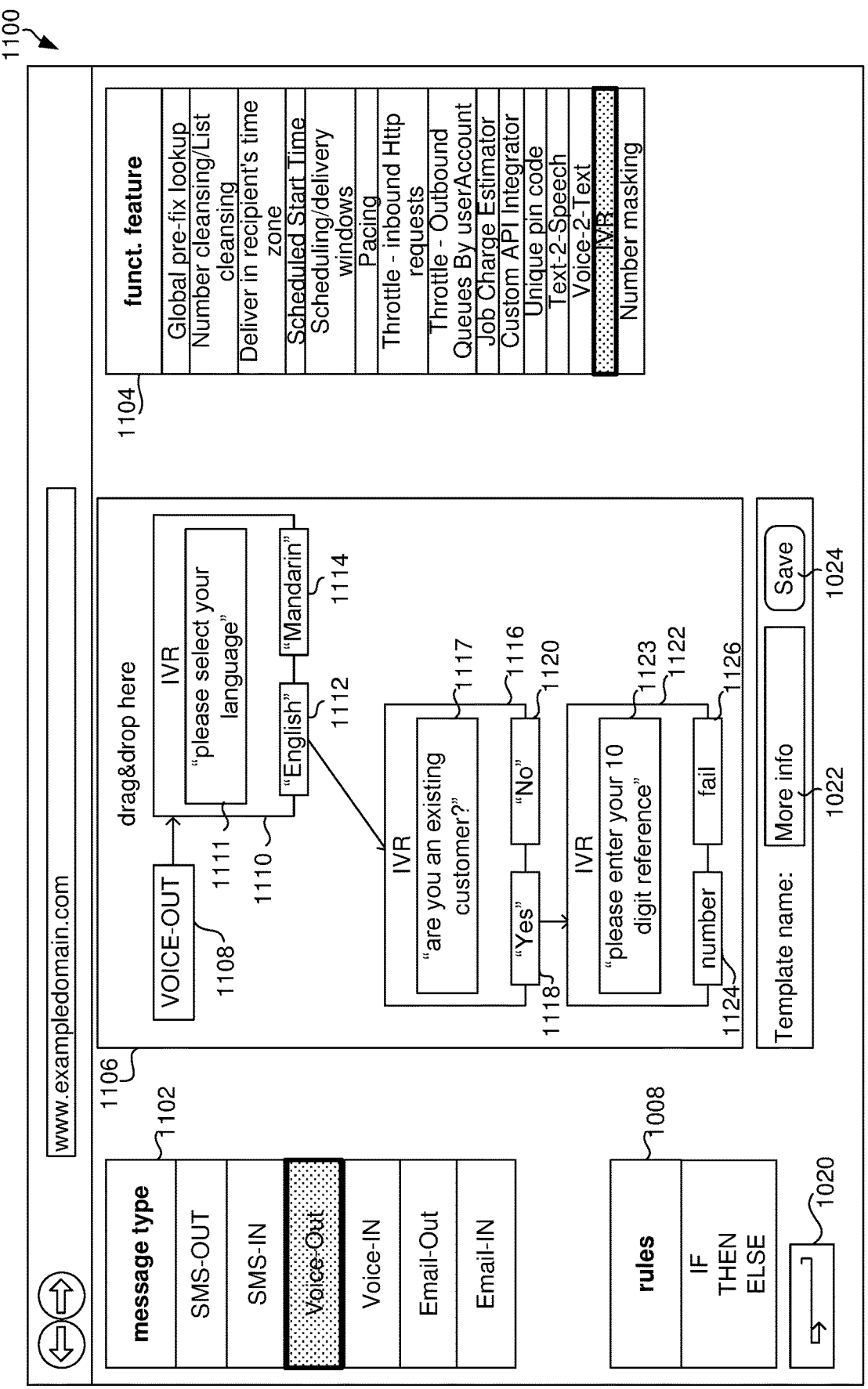
FIG. 11 illustrates yet another example of a drag and drop graphical user interface to set up an interactive voice response system.

FIG. 11 illustrates another example of a graphical user interface 1100 as generated by processor 102. In this example, the message is a voice message of an interactive voice response (IVR) setup where automated messages guide the recipient through various options or menu items. The recipients can select options or make decisions by pressing number buttons on the telephone, also referred to as dual-tone multiple-frequency (DTMF) signalling or by saying voice commands, such as "Yes" or "No".

As before, user interface 1100 comprises a list of message types 1102, a list of function features 1104 and a design area 1106. In this example, user 128 has created a "VOICE-OUT" instance 1108 connected to a first "IVR" instance 1110. First "IVR" instance 1110 comprises a text box 1111, first option connector 1112 and second option connector 1114. When processor 102 receives a telephone number as an address associated with this template, processor 102 initiates a voice call to that number and synthesises a voice for the text in text box 1111 and the two options 1112 and 1114. Processor 102 may add generic language, such as "press one for" before "English".

User 128 has connected the first connector 1112 associated with the option "English" as the language to a similar second "IVR" instance 1116. Second "IVR" instance 118 allows the recipient to indicate whether the recipient is an existing customer and comprises text box 1117, "yes" connector 1118 and "no" connector 11120. The "yes" connector 1118 is connected to a third "IVR" instance 1022 having text box 1123 that asks the recipient to enter a reference number, which is available to the template through the "number" connector 1124. The third "IVR" instance 1122 further comprises a "fail" connector 1126 that may be used for error handling.

Processor 102 may create and store the menu structure as a template by receiving indications that the user 128 has dragged the instances 1108, 1110, 1116 and 1122 into design area 606 and connected them with connector tool 620 as described above.

Figure 12:
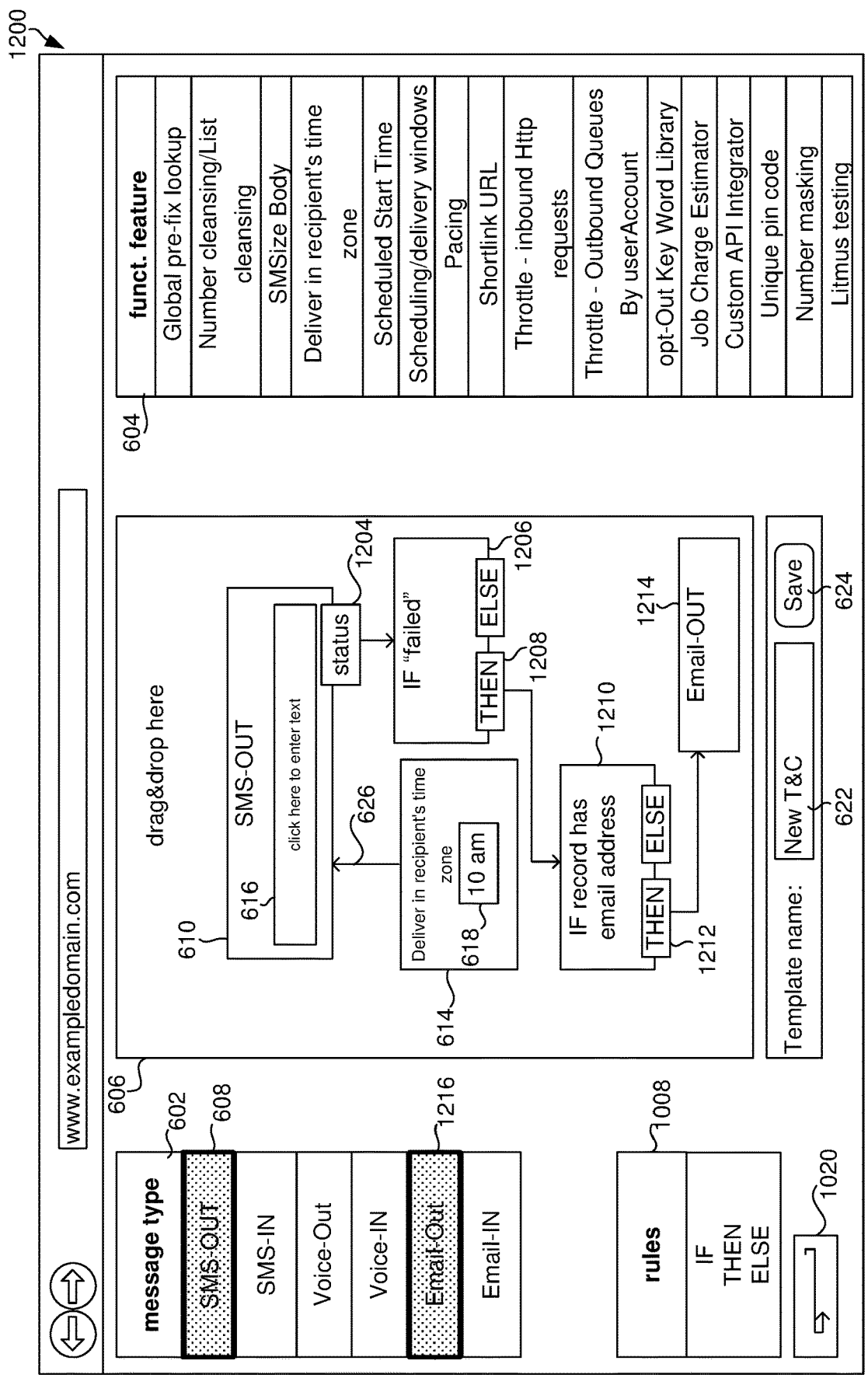
FIG. 12 illustrates a module architecture of the computer system of FIG. 1.

FIG. 12 illustrates another example, which could be seen as an extension of the example in FIG. 6. Again, the user 128 has created an "SMS-OUT" instance 610 and connected this instance 610 with a functional feature instance and in particular, a "Deliver in recipient's time zone" instance 614. In addition to FIG. 6, the "SMS-OUT" instance 610 displayed by processor 102 now has a status connector 1204 that allows accessing the status as represented by the deliver receipt from the carrier.

Processor 102 received interrupt signals and data from user input devices 124/126 to indicate that user 128 has used the connector tool 1020 to connect the status connector 1204 to a newly created first "If Then Else" instance 1206. The first "If Then Else" instance 1206 has a "Then" connector 1208 that processor 102 will follow if the condition given in the "If Then Else" instance 1206 is satisfied. In this case, the user 128 has configured the first "If Then Else" instance 1206 to test the status for being "failed".

User 128 has connected the "Then" connector 1208 to a second "If Then Else" instance 1210, which is configured to test whether the record of the failed SMS has an email address. The second "If Then Else" instance 1210 also has a "Then" connector 1212 that user 128 has connected to an "Email-OUT" instance 1214. As explained above, the "Email-OUT" instance 1214 is created by the processor 102 detecting dragging of the "Email-Out" message type 1216 onto the working space 606.

Processor 102 receives data and signals indicative of the user actions described above and creates a template accordingly. After the processor 102 has then sent the SMS messages, processor 102 monitors the return of status messages. When the processor 102 receives a status message, processor 102 performs the steps according to the stored template that is, in turn, generated by the user as shown in FIG. 12. In this example, if the sending the SMS has failed, the processor 102 will send an email as well.

Figure 13:
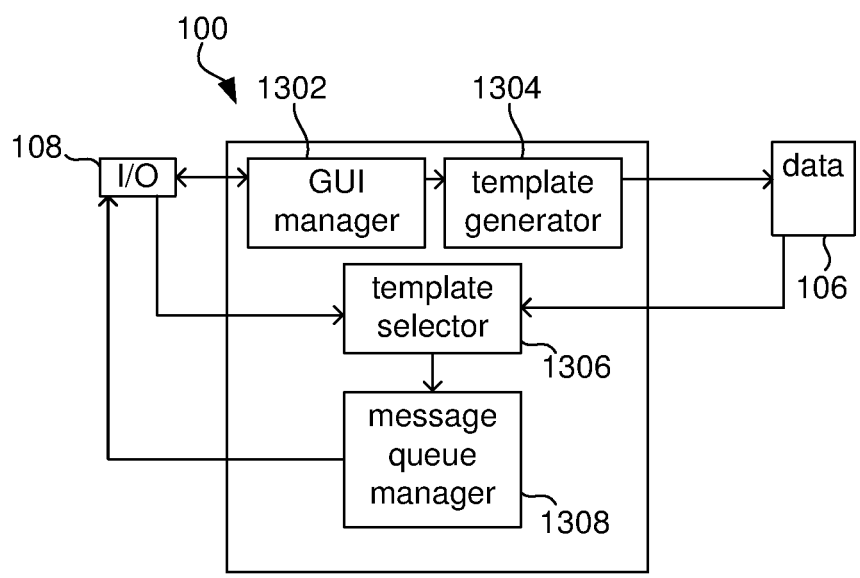
FIG. 13 illustrates the computer system from FIG. 1 in more functional detail.

FIG. 13 illustrates computer system 100 in more functional detail. As explained with reference to FIG. 1, computer system 100 comprises a data port 108 and a data memory 106. Computer system 100 further comprises a GUI manager module 1302, template generator module 1304, template selector module 1306 and message queue manager module 1308. The GUI manager module 1302, template generator module 1304, template selector module 1306 and message queue manager module 1308 may be implemented as different software modules, such as C++ or Java classes, executed by processor 102.

When in use, GUI manager module generates a graphical user interface comprising a first user input element to present multiple message types as options to a user and a second user input element to present multiple functional features for each of the multiple message types to the user. GUI manager module 1302 is communicatively coupled to data port 108 to provide the graphical user interface to client computer 120 in FIG. 1.

GUI manager module also receives through port 108 user input in relation to the user interface indicative of one or more selected message types and one or more selected functional features for each of the one or more selected message types. GUI manager module 1302 provides the user input to template generator module 1304, which generates a template and stores the template as one of multiple templates on data store 106 associated with a template identifier. The template comprises data indicative of the one or more selected message types and the one or more selected functional features according to the user input received by GUI manager module 1302 through data port 108.

Template selector module 1306 receives message generation request data via port 108. The message generation request data comprises one or more message addresses associated with a template identifier. The template selector module 1306 selects a template from the multiple templates on data store 106 such that the selected template is associated with the received template identifier. The template selector module 1306 also passes the one or more message addresses to the message queue manager 1308.

The message queue manager 1308 creates for each of the one or more message addresses a message associated with that message address and sends each message to the associated message address.

Referring back to method 200 in FIG. 2 it is noted that the step 202 of generating the graphical user interface may comprise generating two pages of a graphical user interface. In that case, the user element that allows the user to select the message type is located on the first page. Further, the user element that allows the user to select the functional features is located on the second page.

Figure 14:
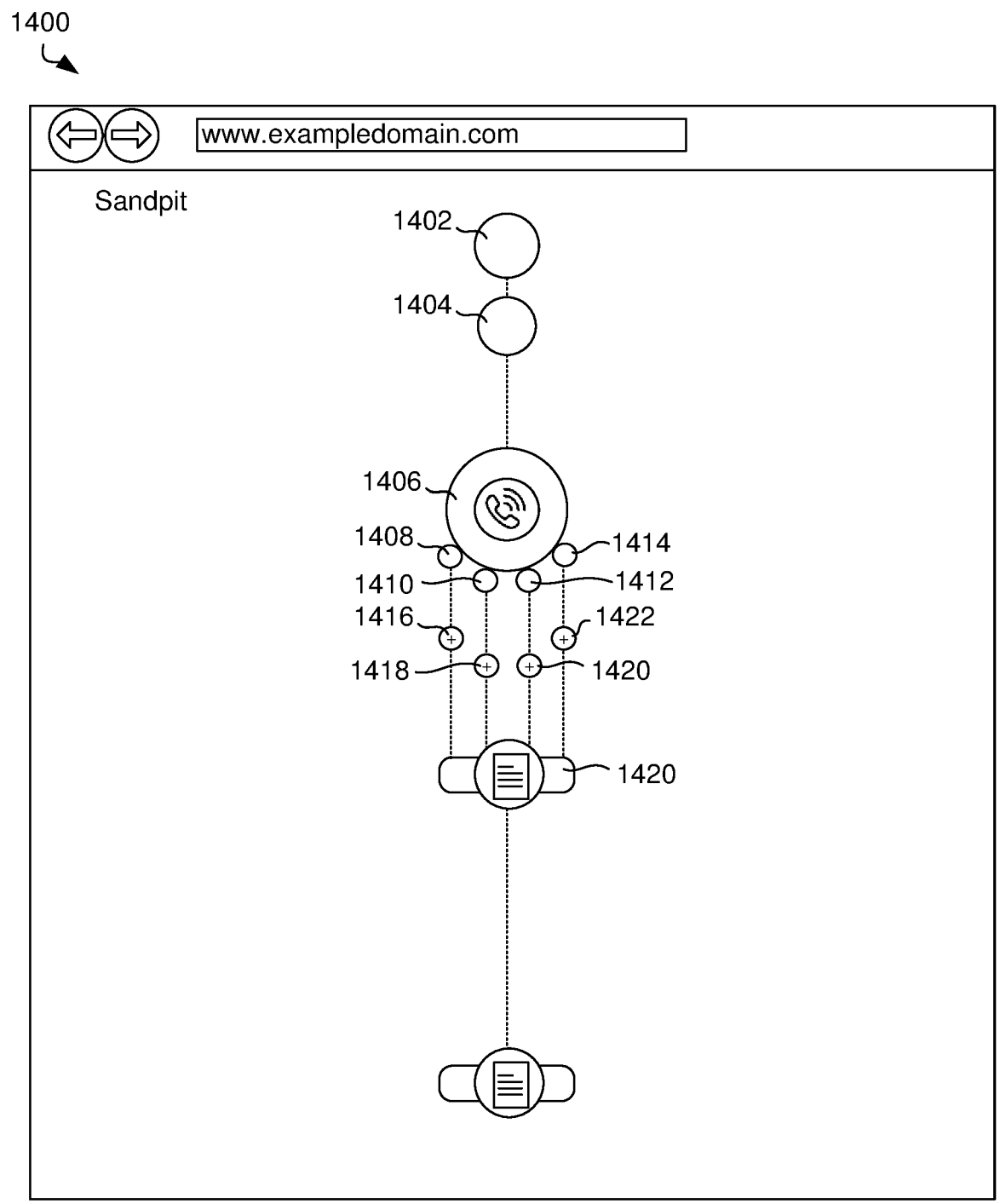
FIG. 14 illustrates a sandpit user interface where the processor generates a high level overview over the message generation.

FIG. 14 illustrates a sandpit user interface 1400 where the processor 102 generates a high level overview over the message generation. Sandpit user interface comprises a pre-launch check button 1402, an API call button 1404, and a message type button 1406. Clicking on the API call button 1404 opens a message type selection page of the user interface.

Figure 15:
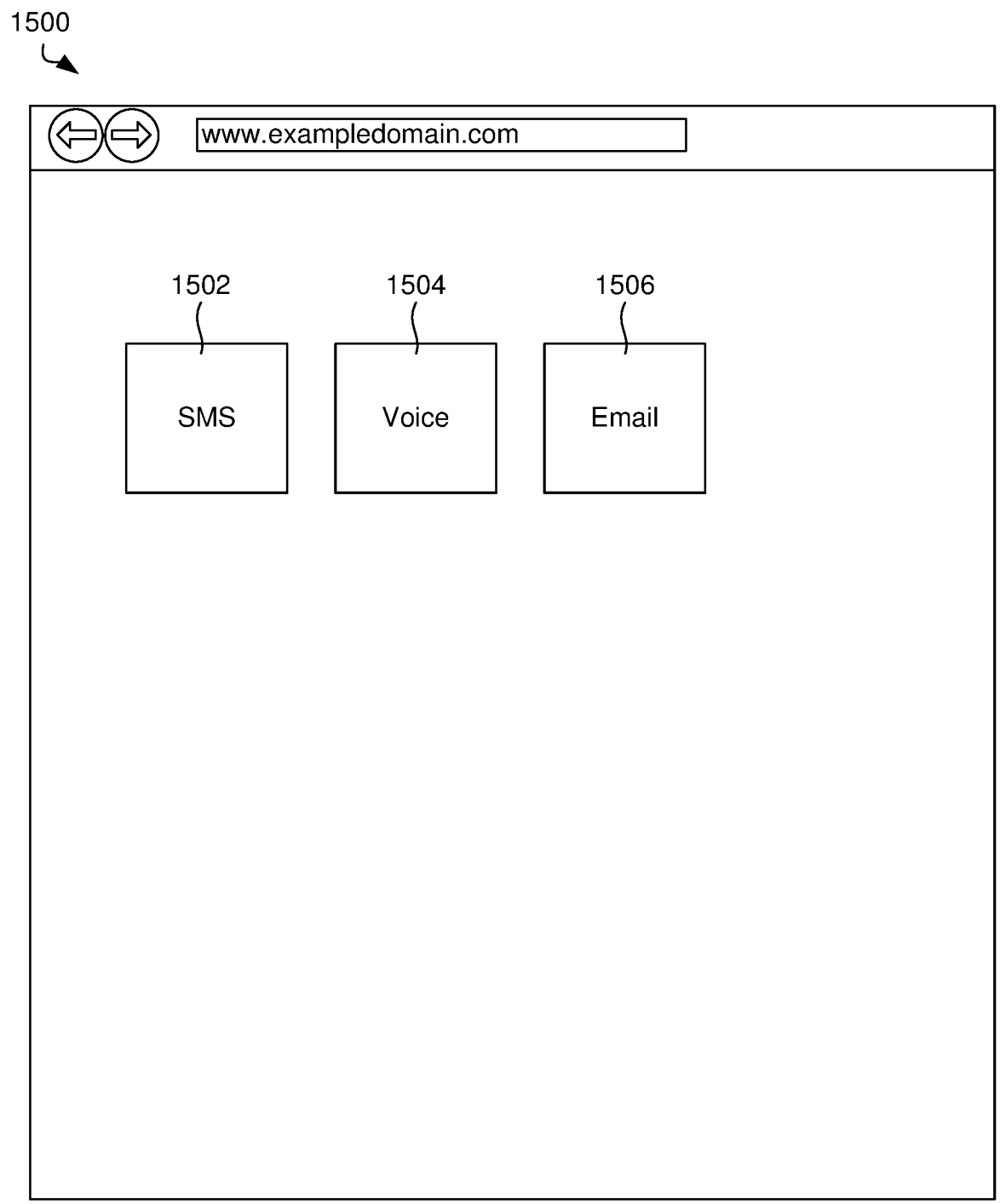
FIG. 15 illustrates a first page of the user interface as also generated by processor to allow the user to select a message type.

FIG. 15 illustrates a first page 1500 of the user interface as also generated by processor 102 to allow the user to select a message type. This massage type selection page 1500 comprises a first button 1502 for selecting SMS as the message type, a second button 1504 for selecting voice as the message type and a third button 1506 for selecting email as the message type.

Processor 102 monitors user interaction with the elements on message type selection page 1500 and upon detecting user interaction, processor 102 associates the corresponding message type with the message type button 1406 in sandpit 1400 on FIG. 14. In this example, user clicks on Voice button 1504 and correspondingly, processor 102 replaces the icon in the middle of the central message type button 1406 with a phone icon.

The user can then click on the message type button 1406 and in response, processor 102 generates the second page of the user interface that allows the user to select the functional features.

Figure 16:
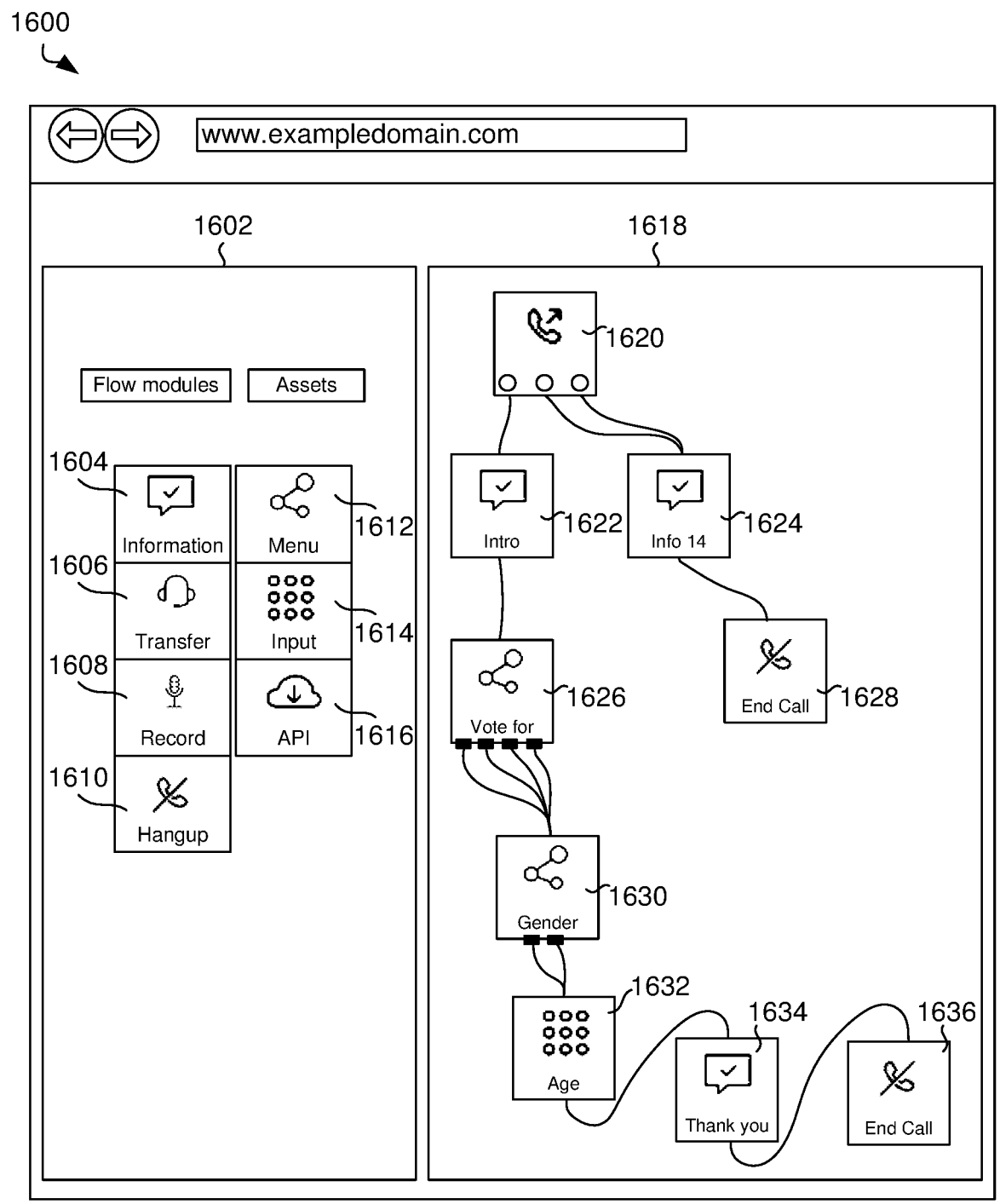
FIG. 16 illustrates a second page of the graphical user interface generated by processor.

FIG. 16 illustrates a second page 1600 of the graphical user interface generated by processor 102. As described earlier with reference to FIG. 11, the second page 1600 comprises user input elements to present multiple functional features one or more of the multiple message types to the user. In the example of FIG. 16, processor 102 presents functional features for the IVR or voice message type to the user.

In particular, second page 1600 illustrates a set of functional features 1602 comprising an information feature 1604, a transfer feature 1606, a record feature 1608, a hangup feature 1610, a menu feature 1612, in input feature 1614 and an API feature 1616. Similar to FIG. 6, second page 1600 comprises a design area 1618 into which the user can drag the function features from functional feature set 1602.

Processor 102 detects user interaction with relation to the set of functional features 1602 and the design area 1618 to detect dragging operations from the user to instantiate one of the functional features in the design area 1618 or to connect the instanced dragged into the design area 1618. In the example of FIG. 16, processor 102 automatically creates a pick-up instance 1620 where the call starts. Processor 102 further detects user interaction to create an intro instance 1622 and an info instance 1624 and connection of the intro instance 1622 to a callee pickup connector and the info instance 1624 to an answering machine connector of the pickup instance 1612.

An end call instance 1628 is similarly created and connected to the info instance 1624 to hang up after a message has been left on the answering machine.

A first menu instance 1626 is created that gives the user multiple options to vote for and each option is recorded. The first menu instance 1626 is connected to a second menu instance 1630 that gives the user two options for gender, which is again recorded. Finally, there is an age input 1632 connected to a thank you information instance 1634 and to an end call instance 1636 at the end.

Figure 17:
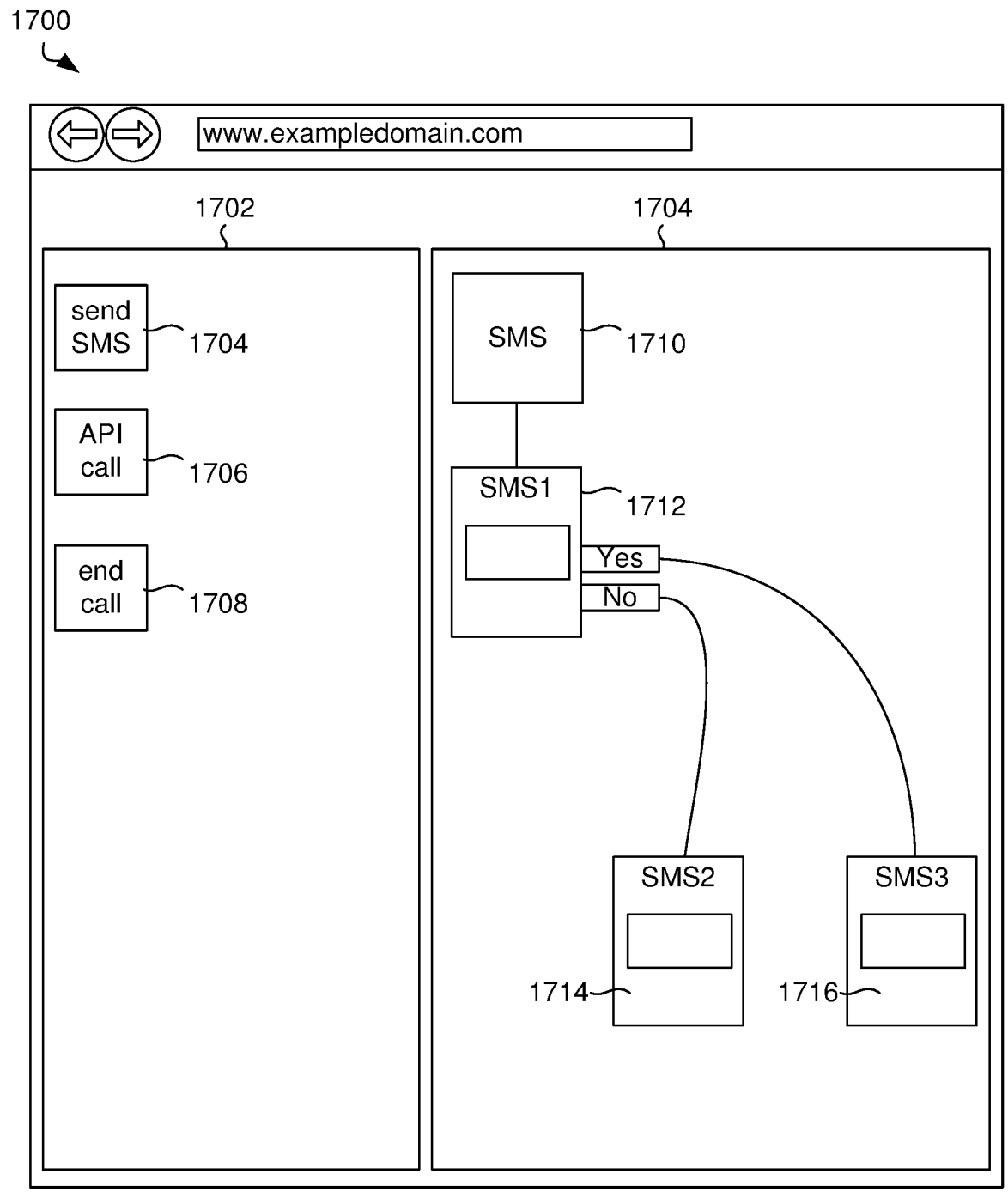
FIG. 17 illustrates another example of a second page of the user interface for the message type of text message comprising a set of functional features for the SMS message type and a design area.

FIG. 17 illustrates another example of a second page 1700 of the user interface for the message type of text message comprising a set of functional features 1702 for the SMS message type and a design area 1704. The set of functional features 1702 comprises send feature 1704, API call feature 1706 and end call feature 1708. The design area 1704 shows the result of dragging functional features across to create instances and connecting them. In particular, there is an SMS start instance 1710 automatically created by processor 102 and connected to a first SMS instance 1712. Two connectors of the first SMS instance 1712 are associated with replies from the recipient and connected to a second SMS instance 1714 and a second SMS instance 1716.

Figure 18:
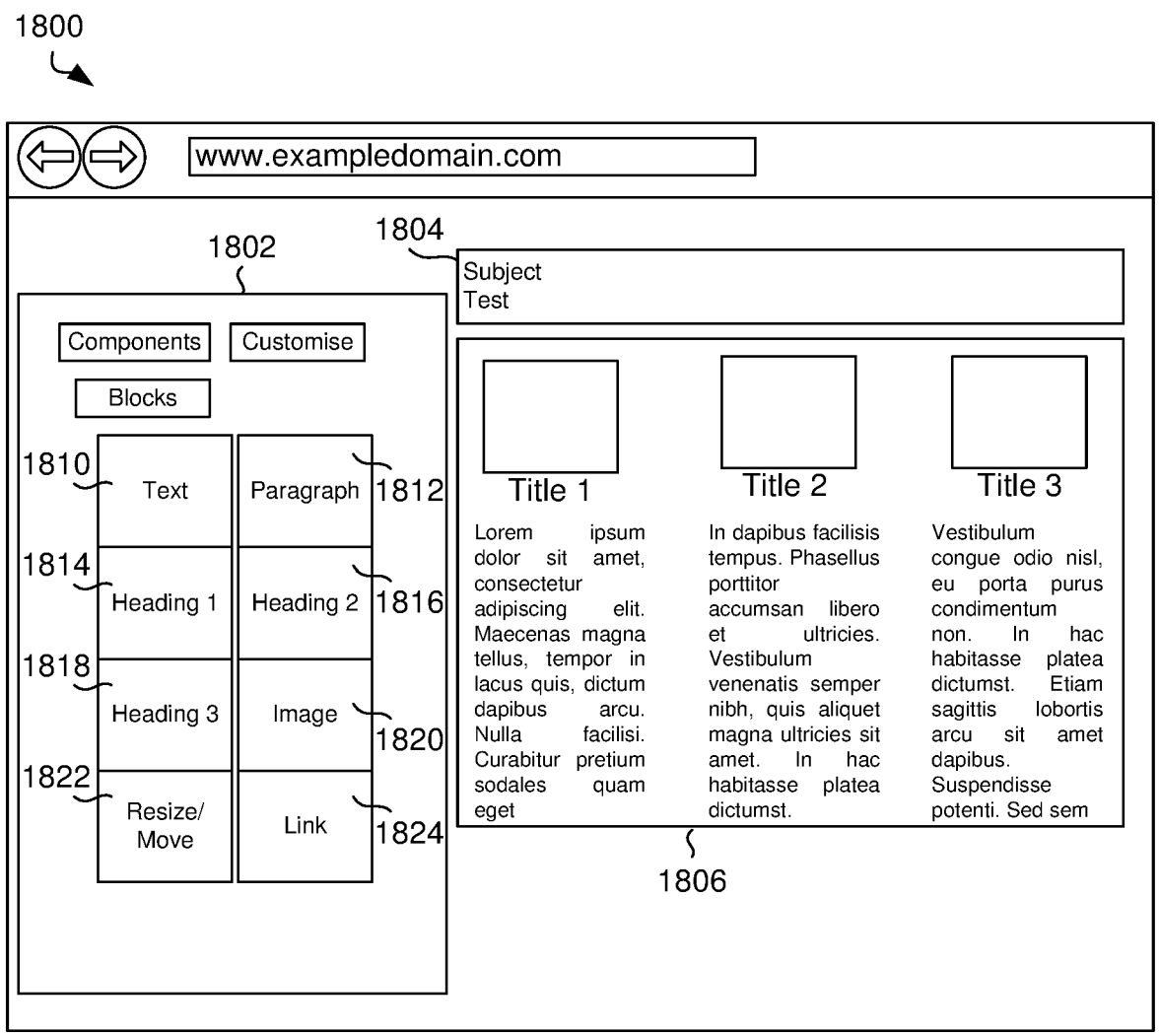
FIG. 18 illustrates an editor comprising a set of features, a subject field to allow the user to enter a subject line and a body text area.

FIG. 18 illustrates an editor comprising a set of features 1802, a subject field 1804 to allow the user to enter a subject line and a body text area 1806. Similar to the previously described user interfaces, processor 102 monitors user interaction with the features 1802 and creates instances in response to detecting a corresponding drag and drop user operation. In this example, the set of features 1802 comprises a text feature 1810, a paragraph feature 1812, a main heading feature 1814, a sub-heading feature 1816, a sub-sub heading feature 1818, an image feature 1820, a resize/move tool 1822 and a link feature 1824.

In one example, processor 102 automatically stores a document that represents the design in the body text area. Processor 102 may store the document in various different formats. For example, processor 102 stores the document as an HTML4 or plain text document, which can then be used as an email when the user selects email as message type. Processor 102 may also store the document as an HTML5 document for optimal browser representation, such as in the form of a microsite. Processor 102 may store documents on a webserver so that they are accessible by a browser application on a document URL. In one example, processor 102 generates a short URL, such as by requesting the short URL from a third party provider, such as Google. The short URL can then be advantageously used in an SMS where the number of characters is limited. The HTML5 document of the microsite may then represent a responsive design optimised for display on small screens of mobile phones such that the recipient can conveniently click on the short URL in the SMS and visit the microsite on the user's phone.

In another example, the document 1806 may not be interactive and processor 102 stores the document as a PDF document that the user can download, read and print for their records. It is an advantage that the user designs the document once using editor 1800 for many different uses such as HTML5 for a microsite, HTML4 for email and PDF for record keeping, which is more efficient than creating and maintaining several different versions concurrently.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A method for sending electronic messages, the method comprising:
   generating a graphical user interface, the graphical user interface comprising:
      a first user input element to present multiple message types as options to a user, and
      a second user input element to present multiple functional features for the multiple message types to the user;
      wherein one or more of the first user element and the second user element comprise drag and drop items;
   receiving user input in relation to the graphical user interface indicative of a drag and drop of a first message type of the multiple message types, creating an instance of the first message type on the graphical user interface;
   receiving user input in relation to the graphical user interface indicative of a drag and drop of a first functional feature of the multiple functional features in relation to the first message type;
   creating an instance of the first functional feature connected to the first message type on the graphical user interface including multiple connectors, each of the multiple connectors representing a different possible output of the first functional feature;
   receiving user input in relation to the graphical user interface indicative of a drag and drop of a second message type of the multiple message types;
   creating an instance of the second message type on the graphical user interface;
   receiving user input in relation to the graphical user interface indicative of a connection between one of the multiple connectors and the second message type;
   storing a first template as one of multiple templates on a data store associated with a template identifier, the first template comprising data indicative of the first and second message types, the first functional feature and the connection;
   receiving message generation request data, the message generation request data comprising one or more message addresses associated with the template identifier;
   selecting a second template from the multiple templates, wherein the second template is associated with the template identifier;
   creating for each of the one or more message addresses an electronic message associated with that message address; and
   sending each electronic message to the associated message address.

2. The method of claim 1, further comprising receiving scheduling data, wherein sending each electronic message comprises determining a schedule for sending each message based on the scheduling data.

3. The method of claim 2, wherein receiving scheduling data comprises one or more of receiving scheduling data from the user through the graphical user interface; and receiving scheduling data as part of the message generation request data.

4. The method of claim 2, wherein the scheduling data comprises data indicative of a time window for sending the electronic messages.

5. The method of claim 2, wherein the scheduling data comprises data indicative of a starting time for sending the electronic messages.

6. The method of claim 2, further comprising determining an association between a message address and a time zone wherein determining a schedule for sending each message is based on the time zone, wherein determining the association between the message address and the time zone comprises determining a prefix of a telephone number.

7. The method of claim 1, wherein receiving message generation request data comprises receiving an incoming phone call at an incoming telephone number and the incoming telephone number is the template identifier.

8. The method of claim 1, wherein sending each electronic message comprises creating a job item for each electronic message and storing the job item in a job queue.

9. The method of claim 1, wherein the message generation request data is one or more of XML and JSON data and the method further comprises determining the template identifier based on the one or more of XML and JSON data.

10. The method of claim 1, wherein sending the electronic messages comprises determining a destination country and a route comprising a telecommunications provider of the destination country.

11. The method of claim 1, wherein the graphical user interface further comprises a third user input element to present one or more options for relating the message types to the functional features to the user and the method further comprises receiving user input in relation to the third user input element indicative of one or more selected relations that relate the message types to the functional features.

12. The method of claim 11, wherein the selected relation is a conditional element and the method further comprises receiving user input indicative of a condition to configure the selected relation.

13. The method of claim 12, further comprising receiving user input in relation to the first message type to relate a status connector representing a status of sending the first message type to a conditional relation.

14. The method of claim 1, wherein generating the graphical user interface comprises generating the graphical user interface comprising a first page and a second page, wherein the first user input element is located on the first page and the second user input element is located on the second page.

15. The method of claim 1, further comprising: generating a document editor user interface comprising multiple document features; receiving user input in relation to the document editor user interface indicative of one or more selected document features; and storing multiple documents, wherein each of the multiple documents represents the user input in relation to the document editor user interface and is in a different document format.

16. The method of claim 1, further comprising applying a filter to the one or more message addresses and the filter is based on user input data.

17. A non-transitory computer readable medium that has an executable program stored thereon that when executed causes a computer to perform the method of claim 1.

18. A system for sending messages, the system comprising:
- a processor to generate a graphical user interface, the graphical user interface comprising:
- a first user input element to present multiple message types as options to a user, and a second user input element to present multiple functional features for one or more of the multiple message types to the user;
- wherein one or more of the first user element and the second user element comprise drag and drop items;
- a first input port to receive user input in relation to the graphical user interface indicative of a drag and drop of a first message type of the multiple message types, receiving user input in relation to the graphical user interface indicative of a drag and drop of a first functional feature of the multiple functional features in relation to the first message type, receive user input in relation to the graphical user interface indicative of a drag and drop of a second message type of the multiple message types, and receive user input in relation to the graphical user interface indicative of a connection between one of multiple connectors and the second message type;
- wherein an instance of the first functional feature connected to the first message type on the graphical user interface including the multiple connectors, and each of the multiple connectors representing a different possible output of the first functional feature;
- a data store to store a first template as one of multiple templates associated with a template identifier, the first template comprising data indicative of the first and second message types, the first functional feature and the connection;
- a second input port to receive message generation request data, the message generation request data comprising one or more message addresses associated with the template identifier:
- the processor to select a second template from the multiple templates, wherein the second template is associated with the template identifier, and to create for each of the one or more message addresses a message associated with that message address; and
- an output port to send each message to the associated message address.

\* \* \* \* \*